United States Patent Office 3,397,249
Patented Aug. 13, 1968

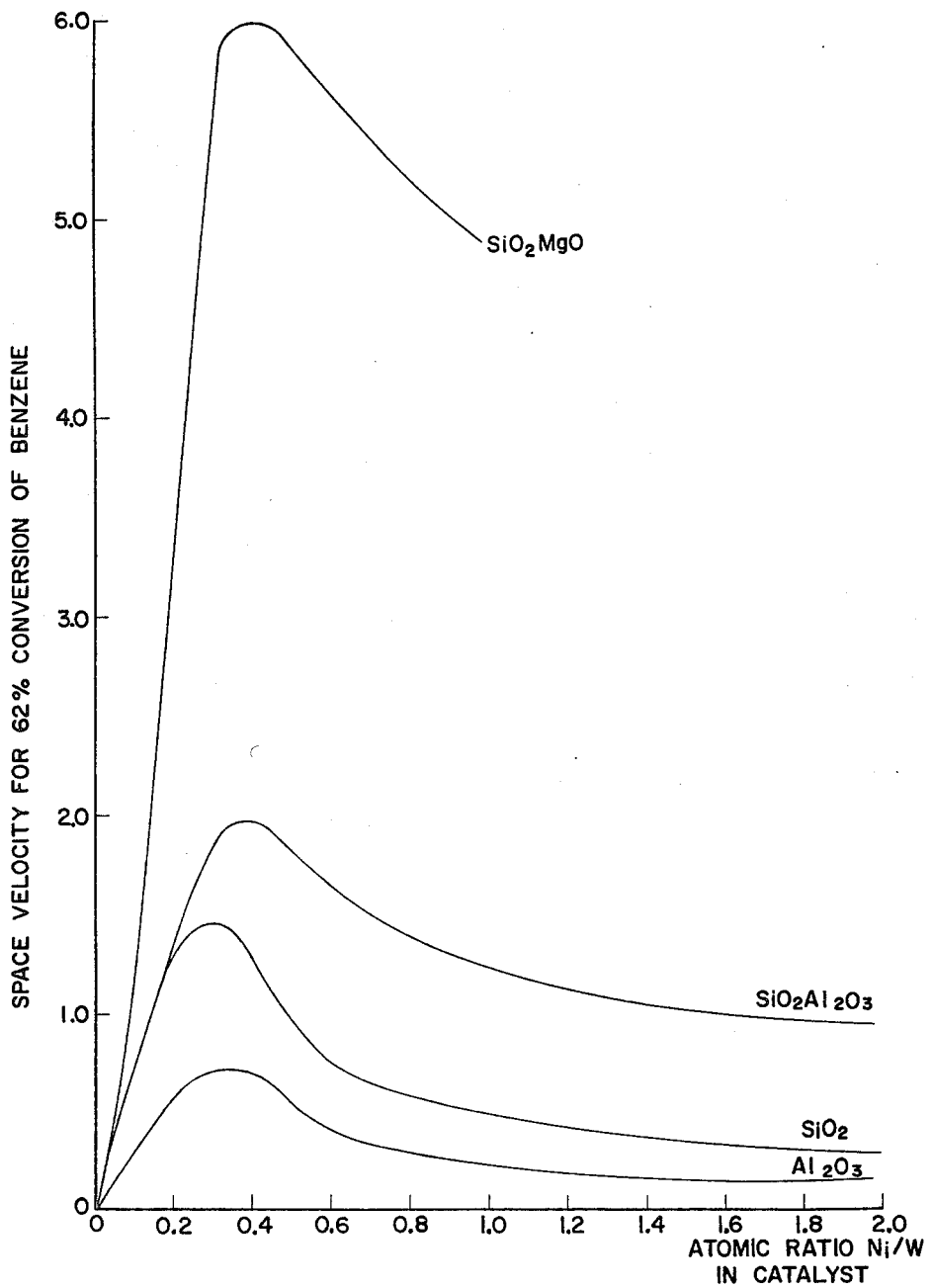

3,397,249
PROCESS FOR THE CATALYTIC HYDROGENATION OF AROMATIC HYDROCARBONS
Pieter C. Aben and Herman W. Kouwenhoven, Amsterdam, Netherlands, assignors to Shell Oil Company, New York, N.Y., a corporation of Delaware
Filed May 9, 1966, Ser. No. 548,677
Claims priority, application Netherlands, May 19, 1965, 6506348
8 Claims. (Cl. 260—667)

This invention relates to a process for the catalytic hydrogenation of hydrocarbons and hydrocarbon mixtures containing aromatic components.

Processes for the hydrogenation of hydrocarbons have been used for a considerable length of time on a commercial scale, for example, in the petroleum and tar industries, for the manufacture of products having improved properties.

Several catalysts are known for these hydrogenations. However, most of these catalysts have practical drawbacks, of either a technological or an economic nature. In many cases their activity and also their lifetime is insufficient. On the other hand, active catalysts often fail with regard to selectivity, i.e., in addition to the hydrogenation, a relatively large part of the hydrocarbon material is cracked to undesired low molecular compounds. This not only proceeds at the expense of yield of desired product, but it also leads to increased consumption of hydrogen. Moreover, catalysts active for removing sulfur and nitrogen frequently require undesirably more severe conditions to hydrogenate aromatics. A drawback in use of active platinum and nickel catalysts which in themselves have excellent hydrogenating properties, is that they are rapidly poisoned by sulfur compounds. Consequently, hydrocarbon oil fractions which usually contain sulfur compounds must be subjected to a preliminary desulfurization. Although so-called sulfur-insensitive catalysts have been developed, the hydrogenating activity of these catalysts as well is generally adversely affected by the presence of sulfur compounds in the hydrocarbons to be hydrogenated.

It has now been found that the hydrogenation of hydrocarbons and hydrocarbon mixtures can be considerably improved by means of catalyst comprising a carrier material consisting entirely or substantially of a combination of silica and magnesia and a hydrogenating component comprising sulfided tungsten and nickel.

The sulfide catalysts used in the present hydrogenation process invention have an extremely high activity for the hydrogenation of aromatics. Besides, they are entirely or substantially sulfur-insensitive, i.e., the activity of the catalysts is not decreased by the presence of sulfur compounds in the hydrocarbons to be hydrogenated.

In contrast with conventional catalysts, the present catalysts allow complete or substantially complete hydrogenation to be attained in one reaction stage without preliminary desulfurization of the hydrocarbon starting material. Also, the high activity permits low severity operation, e.g., at high space velocity and/or low pressure.

The invention therefore relates to a process for the hydrogenation of hydrocarbons or hydrocarbon mixtures containing aromatic compounds. The process comprises contacting the hydrocarbons or hydrocarbon mixtures at elevated temperature and hydrogen pressure with a catalyst comprising sulfided tungsten and nickel supported by a carrier of silica-magnesia.

It is essential to the present process that the sulfided tungsten and nickel hydrogenation components are supported on a carrier consisting entirely or substantially of a combination of silica and magnesia. The magnesia content of the carrier is about 5% to 60% by weight and preferably about 10% to 35% by weight. The amount of the hydrogenation metal component is, as a rule, about 10% to 30% and preferably about 15% to 25% (calculated as metal) basis the weight of the total catalyst. The atomic ratio of tungsten to nickel is in the range from 4:1 to 1:1, with maximum aromatic hydrogenation activity being obtained in the range from 3.5:1 to 1.5:1.

The preparation of the silica-magnesia carrier can be carried out by any known manner. For example, the starting material may be a hydrogel of silica in which, for instance, magnesia in powder form is incorporated by mixing, followed by washing, drying and calcination. When a silica hydrogel is used as the starting material, silica-magnesia can also be prepared in a suitable manner by impregnating the latter with a magnesium salt solution, after which a base, for example ammonia, is added, as a result of which magnesium hydroxide is precipitated in the silica hydrogel. The resultant material is then freed from soluble components by washing and subsequently dried and calcined.

Another mode of preparation comprises reacting a water-soluble magnesium compound with an alkali metal silicate or with an organic silica ester, in such quantities that a hydrosol is formed which is amendable to gelation and which contains the desired amount of magnesium. The sol is subsequently converted into a gel which is washed with water or an aqueous liquid to remove soluble components, after which drying and calcination may follow. The gel is preferably washed to such an extent that its alkali metal content amounts to less than 0.1% w. and preferably to less than 0.05% w.

In general, it is preferred to prepare the silica-magnesia carrier material from silica hydrogel rather than silica gel as this tends to provide a higher hydrogenating activity in the ultimate catalyst.

The metal hydrogenating components can be incorporated with the carrier in a conventional manner. For example, silica-magnesia carrier material having the desired magnesia content (if desired, after milling to the desired particle size) is impregnated with, for instance, an aqueous solution of one or more salts of tungsten and nickel. The impregnated material is subsequently dried in the usual manner and calcined, for example, at 400–500° C., in order to convert the metal salts into the corresponding oxides. Subsequently, the oxides are entirely or partly converted into sulfides. The sulfiding may take place in the gaseous or in the liquid phase. As a rule, it is carried out at elevated temperature, for instance, at from 350 to 450° C., by passing a mixture of hydrogen and hydrogen sulfide, carbon disulfide and/or a mercaptan, such as butyl mercaptan, over the catalyst. Instead of these sulfur compounds, a sulfur-containing hydrocarbon oil, for example a gasoline, kerosene or gas oil, may very well be used as a sulfiding material. The sulfur content of the sulfided catalyst corresponds in general to form 70 to 100% of the theoretical amount required to sulfide the metals.

The process of the invention is particularly applicable to the hydrogenation of single compounds, such as the hydrogenation of benzene to cyclohexane, as well as for various hydrocarbon distillate fractions such as gasoline, kerosene, and gas oils, or other hydrocarbon distillate fractions boiling up to about 375° C. The hydrogenation of aromatics in kerosene fractions is important for increasing smoke point, increasing specific heat of combustion, and improved luminometer number (ASTM D1740) so as to provide suitable fuels for jet engines. With less active catalysts, higher temperatures are required which tend to provide trace quantities of olefins which are detrimental to quality of the finished product. Decreasing the aromatic content of hydrocarbon fractions in the gas oil range tends to provide a product of increased cetane number which is suitable, for example, for use as fuel for diesel engines.

If only a small improvement of the smoke point or cetane number etc., is desired it is of course not necessary to subject the entire feed to dearomatization. In these cases, it is sufficient to subject part of the feed to complete or partial hydrogenation and subsequently to mix this with the non-hydrogenated part.

The hydrogenation according to the present invention can take place in the vapor phase, liquid phase or partly in the vapor and partly in the liquid phase. The process is preferably carried out continuously. The catalysts can be employed in a fluidized or a dispersed state; however, preference is given to a fixed bed catalyst. In view of the relatively low hydrogenating temperatures which can be applied, it is possible to keep the hydrocarbons entirely or substantially in the liquid phase without using particularly high working pressures. A very suitable embodiment of the process, in which the hydrocarbons are passed over the catalyst entirely or partly in the liquid phase, is the so-called trickel technique, which has been described, described, for example, in British patent specification 657,521.

The hydrogenation is carried out at pressures, temperatures and space velocities which may vary within wide limits. As a rule hydrogen partial pressures of from 25 to 150 atom. abs. and preferably of from 40 to 120 atm. abs. are applied. The temperatures are usually chosen in the range of from 250 to 425° C. and preferably of from 300 to 400° C. As a rule, space velocity is from 0.5 to 10 and preferably from 1 to 6 barrels of hydrocarbon per barrel of catalyst per hour. The amount of hydrogen usually amounts to from 500 to 1500 standard cubic feet per barrel of hydrocarbon.

Hydrogenation of aromatic hydrocarbons with the present catalyst can be applied without a preliminary desulfurization of the hydrocarbon feed. This is an important advantage because sulfur-containing starting materials can be hydrogenated and desulfurized in one treatment.

The hydrogen to be used in the process can be in the form of a hydrogen-containing gas, for example, a mixture of hydrogen and low molecular hydrocarbons. When hydrogen is used in excess, it is advantageous to recirculate the used hydrogen. If desired, contaminants, such as hydrogen sulfide or ammonia can be removed from recycle hydrogen. The hydrogen-containing gases preferably should contain more than 50% v. of hydrogen. Very suitable are, for example, hydrogen-containing gases obtained in catalytic reforming of gasoline fractions.

To ensure satisfactory hydrogenation, the amount of hydrogen used is at least equal to the theoretical amount required to obtain the desired conversion of aromatics to naphthenes. In general, to provide a suitably long catalyst life, a considerably larger amount of hydrogen is used.

Regeneration of the catalyst can be effected by an oxidative treatment at elevated temperature with the aid of oxygen-containing gas mixtures, such as mixtures of air and nitrogen and/or steam. After the regeneration, which is carried out at a maximum temperature of 500° C., and sulfiding, the catalyst has in many cases an activity which differs little from the initial one. Several regenerations can be applied without the activity decreasing to an unacceptable value.

EXAMPLE I (A) Preparation of silica-magnesia

The starting material was 2.5 l. of water glass diluted with 7.5 l. of water. After heating at 52° C., 45% nitric acid was slowly added, with stirring, to this solution in a quantity of 530 ml. Under these conditions gelation occurred, after which stirring was continued for another ten minutes. The pH was 10.5. Subsequently, 300 ml. of 45% nitric acid was added to the mixture. As a result, the pH decreased to below 6, then increased and reached a value of 7 after 1½ hours' aging of the reaction mixture. Subsequently, 400 g. of magnesia and such a quantity of 45% nitric acid were gradually added with stirring that the pH reached a value of from 9 to 9.5. The temperature was then raised to 80° C., and kept at this value for one hour with stirring; the pH decreased to 6.6. The suspension thus obtained was filtered, after which the filter cake was distributed in an aqueous solution of magnesium nitrate and then dried at 150° C. Finally, the resultant material was washed with aqueous ammonia in order to remove substantially all traces of sodium compounds. The silica-magnesia thus purified was finally dried at 120° C.

(B) Preparation of the catalyst 180 g. of ammonium tungstate was dissolved with heating in aqueous monoethanolamine. To this solution, an aqueous solution of 20 g. of nickel nitrate was added. The resultant precipitate was dissolved with monoethanolamine. The solution thus obtained was used to impregnate the silica-magnesia prepared according to (A). The impregnated carrier material was then dried at 120° C. and subsequently calcined for 3 hours at 500° C.

(C) Comparative hydrogenating experiments

Comparative hydrogenating experiments were carried out with a number of nickel-tungsten sulfide catalysts having a total metal content of 138 milliatomic weight per per 100 g. of carrier.

The experiments were performed in a tubular reactor at a temperature of 400° C. and a hydrogen pressure of 48 atm. abs. Hydrogenation feed was benzene; the molar ratio of benzene to hydrogen being 1:35.

The catalysts differed on the one hand with respect to nickel-tungsten ratio and on the other with respect to carrier material. In addition to silica-magnesia, conventional carrier materials such as silica, alumina and silica-alumina were used.

In the experiments, the composition of the catalysts has been expressed as the atomic ratio of nickel to tungsten, which atomic ratio varied between 0 and 2.0. This means that catalysts composition varied between the exclusive use of tungsten as the metal component and a combination having an atomic ratio, expressed as tungsten to nickel of 0.5

The results of the experiments are provided in the figure. As a more or less arbitrary measure of the hydrogenating activity of the various catalysts, the space velocity required to obtain a 62% hydrogenation of benzene is given. Four graphs are provided which relate space velocity for 62% hydrogenation of benzene to the ratio of nickel to tungsten for the various carriers of silica-magnesia, alumina, silica and silica-alumina, respectively. These graphs show that for the given conversion the silica-magnesia supported catalysts show surprisingly high activity since very high space velocities can be used. This means that the silica-magnesia-containing catalysts generally have a hydrogenating activity much higher than that of catalysts of a corresponding metal content on conventional carrier materials.

Furthermore, as shown in the figure, the ratio of nickel to tungsten has a considerable influence on the hydrogenating activity and that maximum activity is attained with catalysts whose atomic ratio of nickel to tungsten amounts to approximately 0.25:1 to 1:1 and in particular to approximately 0.28:1 to 0.66:1. When expressed as the atomic ratio of tungsten to nickel this results in ratios of 4:1 to 1:1 and in particular 3.5:1 to 1.5:1.

EXAMPLE II

Comparative hydrogenation experiments were carried out with two commercial sulfided tungsten-nickel-alumina catalysts (A) and (B) and a tungsten-nickel-silica-magnesia catalyst (C).

Catalyst A contained 20.8% tungsten and 3.0% nickel.
Catalyst B contained 19.0% tungsten and 6.0% nickel.
Catalyst C contained 13.5% tungsten and 2.5% nickel.

The experiments were carried out continuously in a tubular reactor at a temperature of 350° C., a space velocity of 2.0 volumes per volume of catalyst per hour and a hydrogen to hydrocarbon ratio of 8500 s.c.f./bbl.

The starting materials were two kerosenes with sulfur contents of 2100 and 3 p.p.m. w., respectively, and with aromatics content of 18.0 and 14.5% v., respectively. The experiments were carried out at pressures of both 60 kg./cm.$^2$ and 100 kg./cm.$^2$.

Analyses of the reaction products showed that the hydrogenation proceeded stably after a short time and that between the 20th and the 100th run hour there were hardly any differences in product consumption.

The results of the comparative experiments are listed in the table below.

TABLE

| | Catalyst | | | | | |
|---|---|---|---|---|---|---|
| | A | | B | | C | |
| | W-Ni-S-Al$_2$O$_3$ (20.8% W, 3.0% Ni) | | W-Ni-S-Al$_2$O$_3$ (19.0% W, 6.0% Ni) | | W-Ni-S-silica-magnesia (13.5% W, 2.5% Ni) | |
| Reaction pressure, kg./cm.$^2$ | 60 | 100 | 60 | 100 | 60 | 100 |
| Feed I (2,100 p.p.m. w. of sulfur) Product: Aromatics, percent v | 11.5 | 5.0 | 11.5 | 6.0 | 5.0 | 0.5 |
| Feed II (3 p.p.m. w. of sulfur) Product: Aromatics, percent v | 9.5 | 2.5 | 5.5 | 0.5 | 4.5 | Traces |

The experimental results show:

(1) that with the present catalyst, when starting with a sulfur-containing feed, a considerably lower aromatics content (5%) is obtained than with the two commercial catalysts (11.5%);

(2) that an aromatics content of 5% can only be obtained with the commercial catalysts by raising the hydrogenation pressure from 60 to 100 kg./cm.$^2$;

(3) that the commercial catalysts yield a lower aromatics content when desulfurized kerosene is used as the starting material; that with the present catalyst, the sulfur content of the feed has hardly any influence on hydrogenation of the aromatics;

(4) that the high hydrogenation activity of the present catalyst is attained with a considerably lower tungsten-nickel content, namely about ⅔ of the metal content of the commercial catalysts.

We claim as our invention:

1. A process for the hydrogenation of aromatic hydrocarbons which comprises contacting said hydrocarbons at an elevated temperature and hydrogen pressure with a catalyst comprising sulfided tungsten and nickel on silica-magnesia, the atomic ratio of tungsten to nickel being from 4:1 to 1:1.

2. The process according to claim 1 wherein the silica-magnesia contains about 5% to 60% by weight magnesia.

3. The process according to claim 1 wherein the total amount of tungsten and nickel is from about 10% to 30% by weight of the total catalyst.

4. The process according to claim 1 wherein the hydrogenation is carried out at a temperature of about 250° to 425° C. and a hydrogen partial pressure of about 25 to 150 atmospheres absolute.

5. The process according to claim 4 wherein the silica-magnesia contains about 5% to 60% by weight magnesia and the total amount of tungsten and nickel is from about 10% to 30% by weight of the total catalyst.

6. The process according to claim 4 wherein the atomic ratio of tungsten to nickel is 3.5:1 to 1.5:1.

7. The process according to claim 4 wherein the aromatic hydrocarbon is a kerosene fraction.

8. The process according to claim 2 wherein the silica-magnesia is prepared from a silica hydrogel.

References Cited

UNITED STATES PATENTS

| 3,287,258 | 11/1966 | Mason | 208—143 |
| 3,239,454 | 3/1966 | Streed et al. | 208—143 |
| 3,291,722 | 12/1966 | Taylor et al. | 208—143 |
| 3,281,352 | 10/1966 | Schuman | 208—143 |
| 3,227,768 | 1/1966 | Cole | 260—667 |
| 3,222,274 | 12/1965 | Carl | 260—667 |

DELBERT E. GANTZ, *Primary Examiner.*

V. O'KEEFE, *Assistant Examiner.*